US012031700B2

(12) United States Patent
Fu et al.

(10) Patent No.: US 12,031,700 B2
(45) Date of Patent: Jul. 9, 2024

(54) TRIM UNIT FOR LAMP AND LAMP

(71) Applicant: SAVANT TECHNOLOGIES LLC, East Cleveland, OH (US)

(72) Inventors: Yao Fu, Shanghai (CN); Yin Suo, Shanghai (CN); Huisheng Zhou, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 67 days.

(21) Appl. No.: 17/572,498

(22) Filed: Jan. 10, 2022

(65) Prior Publication Data

US 2022/0221134 A1 Jul. 14, 2022

(30) Foreign Application Priority Data

Jan. 14, 2021 (CN) ......................... 202120098252.8

(51) Int. Cl.

| | |
|---|---|
| ***F21S 8/02*** | (2006.01) |
| ***F21S 9/02*** | (2006.01) |
| ***F21V 5/00*** | (2018.01) |
| ***F21V 9/08*** | (2018.01) |
| ***F21V 9/40*** | (2018.01) |

(Continued)

(52) U.S. Cl.

CPC .............. *F21V 17/002* (2013.01); *F21S 9/02* (2013.01); *F21V 5/00* (2013.01); *F21V 9/08* (2013.01); *F21V 9/40* (2018.02); *F21V 17/02* (2013.01)

(58) Field of Classification Search

CPC ...... F21S 8/02; F21S 8/026; F21V 21/04–049

See application file for complete search history.

(56) References Cited

U.S. PATENT DOCUMENTS

| | | | | |
|---|---|---|---|---|
| 6,909,239 | B2 | 6/2005 | Gauna | |
| 7,500,766 | B1 * | 3/2009 | Reynolds .................. | F21S 8/02 362/365 |

(Continued)

FOREIGN PATENT DOCUMENTS

| | | | |
|---|---|---|---|
| AU | 2014203823 | A | 1/2015 |
| CN | 101627252 | A | 1/2010 |

(Continued)

OTHER PUBLICATIONS

"Commercial Electric 4 in. Selectable Integrated LED Recessed Trim Can Light with Night Light Feature 5 CCT 625 Lumens 11 Watts Dimmable." Amazon Store, 9 pages, Accessed Jul. 21, 2023. https://www.amazon.com/Commercial-Electric-Selectable-Integrated-Recessed/dp/B07ZG855Y3.

(Continued)

*Primary Examiner* — Sean P Gramling

(74) *Attorney, Agent, or Firm* — WOOD IP LLC

(57) ABSTRACT

Disclosed are a trim unit for a lamp and the lamp. The trim unit for the lamp includes: one or more installation parts, through enabling the installation parts to be abutted with a corresponding fixture of a lamp main body of the lamp, the trim unit may be fixed to the lamp main body at a light-emitting end of the lamp main body in a removable manner, and the trim unit includes an adjusting part, the adjusting part adjusts light emitted by an illuminating unit installed in the lamp main body. Therefore, a problem in the related art that an appearance decoration effect of the lamp is monotonous is solved.

20 Claims, 8 Drawing Sheets

(51) Int. Cl.

| | |
|---|---|
| ***F21V 17/00*** | (2006.01) |
| ***F21V 17/02*** | (2006.01) |
| ***F21V 21/04*** | (2006.01) |

(56) References Cited

U.S. PATENT DOCUMENTS

| | | | | |
|---|---|---|---|---|
| 7,654,705 | B2 | 2/2010 | Czech et al. | |
| 8,070,328 | B1 * | 12/2011 | Knoble | F21V 3/00 362/345 |
| 9,062,866 | B1 * | 6/2015 | Christ | F21V 29/70 |
| 9,239,149 | B2 | 1/2016 | Vice et al. | |
| 2015/0241038 | A1 | 8/2015 | Fryzek | |
| 2020/0191344 | A1 | 6/2020 | Van Winkle | |

FOREIGN PATENT DOCUMENTS

| | | | |
|---|---|---|---|
| CN | 201416817 | Y | 3/2010 |
| CN | 109340625 | A | 2/2019 |
| CN | 209341046 | U | 9/2019 |
| CN | 211232609 | U | 8/2020 |

OTHER PUBLICATIONS

Canadian Office Action for Canadian Application No. 3,142,823 dated Aug. 29, 2023, 3 pages.

* cited by examiner (A)

(B)

TRIM UNIT FOR LAMP AND LAMP

TECHNICAL FIELD

The disclosure relates to the field of lamp accessories, and in particular to a downlight trim.

BACKGROUND

A downlight is generally embedded in a ceiling to illuminate in the form of downwards emitting light, the downlight, as a decorative lamp, is widely used in the fields of commerce, office buildings and home lighting because it does not occupy a space and may increase a soft atmosphere of the space.

In a conventional downlight structure, a light-emitting end of the downlight is provided with a trim ring, and light emitted by the downlight is emitted through a light exit port in the middle of the trim ring. Because a main body of the downlight is hidden in the ceiling, it only enhances a decorative effect of the downlight itself by a change of a color and a texture of the trim ring installed at the light-emitting end.

Along with continuous improvement and change of people requirements, it is desired that the decorative effect and lighting effect of the downlight may be changed in a more convenient manner.

SUMMARY

Therefore, in view of an existing state in the above related art, a purpose of the disclosure is to provide a trim unit which is installed in a lamp main body in a detachable manner, the trim unit not only allows a user to more easily change an appearance decorative effect of a lamp without being restricted by an installation height, but also change a type and/or a style of light emitted from the lamp. Because a stock keeping unit (SKU) may be assigned to such a lamp trim unit, rather than one SKU is necessarily assigned to each combination of the lamp and the trim unit, the number of the SKU of a lamp production line is generally reduced for a manufacturer. In addition, for the user, when a different decorative effect or light effect is required, there is no need to purchase a lamp again, and the user only needs to purchase a different trim unit to adapt to the present lamp.

In order to achieve the above purpose, the disclosure adopts the following technical schemes.

According to one aspect of the disclosure, a trim unit for a lamp is provided, including: one or more installation parts, through enabling the installation parts to be abutted with a corresponding fixture of a lamp main body of the lamp, the trim unit is fixed to the lamp main body at a light-emitting end of the lamp main body in a removable manner, and the trim unit includes an adjusting part, the adjusting part adjusts light emitted by an illuminating unit installed in the lamp main body.

Preferably, the adjusting part includes at least one of the followings: a grid structure, a surface roughening structure, and an anti-dazzle film, herein, the adjusting part performs anti-dazzle treatment on the light emitted by the illuminating unit.

Preferably, the trim unit further includes a trim ring, the trim unit is fixed to the lamp main body by the trim ring in the removable manner, herein, the adjusting part is integrally formed with the trim ring, or the adjusting part as a separate component is combined with the trim ring.

Preferably, the adjusting part includes an extension wall longitudinally extended at an outer edge of the trim unit, and the extension wall performs the anti-dazzle treatment on the light emitted by the illuminating unit.

Preferably, the adjusting part is a color filter, and the color filter adjusts a color and/or a light intensity of the light emitted by the illuminating unit.

Preferably, the adjusting part includes a trim ring and a light-shielding plate, the trim ring is provided with one or more installation parts, through enabling the installation parts to be abutted with the corresponding fixture, the trim ring is fixed to the lamp main body at a light-emitting side of the lamp main body, the light-shielding plate includes an inner light-shielding plate and an outer light-shielding plate, the inner light-shielding plate and the outer light-shielding plate can be switched between states of being mutually superposed and unfolded.

Preferably, the inner light-shielding plate is integrally formed with the trim ring, and the inner light-shielding plate is provided with a shaft hole, the inner light-shielding plate and the outer light-shielding plate are connected in a pivot manner, the outer light-shielding plate is rotated in the pivot manner; or the trim ring is provided with a shaft hole, the inner light-shielding plate and the outer light-shielding plate are connected with the trim ring in the pivot manner, and in the case that the inner light-shielding plate and the outer light-shielding plate are switched between the states of being mutually superposed and unfolded, the inner light-shielding plate is kept fixed with respect to the trim ring, and the outer light-shielding plate is rotated in the pivot manner.

Preferably, the adjusting part includes a light-emitting unit, the light-emitting unit is operated independent of the illuminating unit in the lamp main body, or the light-emitting unit is cooperatively operated with the illuminating unit in the lamp main body.

Preferably, in the case that the light-emitting unit is operated independent of the illuminating unit in the lamp main body, a rechargeable battery is provided in the light-emitting unit, and the light-emitting unit is controlled to be operated in at least one of a human body induction control manner, a light sensing control manner or a remote control manner; and in the case that the light-emitting unit is cooperatively operated with the illuminating unit in the lamp main body, the light-emitting unit is electrically connected with the illuminating unit in the lamp main body through a conductor terminal or a wireless charging manner.

According to another aspect of the disclosure, a lamp is provided, including: a lamp main body, an illuminating unit is installed in the lamp main body, and the lamp main body includes one or more fixtures; a trim unit includes one or more installation parts, through enabling the installation parts to be abutted with the corresponding fixture of the lamp main body, the trim unit is fixed to the lamp main body at a light-emitting end of the lamp main body in a removable manner, and the trim unit includes an adjusting part, the adjusting part adjusts light emitted by the illuminating unit.

Preferably, the adjusting part is at least one of the followings: a grid structure, a surface roughening structure, and an anti-dazzle film, and the adjusting part performs anti-dazzle treatment on the light emitted by the illuminating unit.

Preferably, the trim unit further includes a trim ring, the trim unit is fixed to the lamp main body by the trim ring in the removable manner, herein, the adjusting part is integrally formed with the trim ring, or the adjusting part is combined with the trim ring as a separate component.

Preferably, the adjusting part includes an extension wall longitudinally extended at an outer edge of the trim unit, and the extension wall performs the anti-dazzle treatment on the light emitted by the illuminating unit.

Preferably, the adjusting part is a color filter, and the color filter adjusts a color and/or a light intensity of the light emitted by the illuminating unit.

Preferably, the adjusting part includes a trim ring and a light-shielding plate, the trim ring is provided with one or more installation parts, through enabling the installation parts to be abutted with the corresponding fixture, the trim ring is fixed to the lamp main body at a light-emitting side of the lamp main body, the light-shielding plate includes an inner light-shielding plate and an outer light-shielding plate, the inner light-shielding plate and the outer light-shielding plate can be switched between states of being mutually superposed and unfolded.

Preferably, the inner light-shielding plate is integrally formed with the trim ring, and the inner light-shielding plate is provided with a shaft hole, the inner light-shielding plate and the outer light-shielding plate are connected in a pivot manner, the outer light-shielding plate is rotated in the pivot manner; or the trim ring is provided with a shaft hole, the inner light-shielding plate and the outer light-shielding plate are connected with the trim ring in the pivot manner, and in the case that the inner light-shielding plate and the outer light-shielding plate are switched between the states of being mutually superposed and unfolded, the inner light-shielding plate is kept fixed relative to the trim ring, and the outer light-shielding plate is rotated in the pivot manner.

Preferably, the adjusting part includes a light-emitting unit, the light-emitting unit is operated independent of the illuminating unit in the lamp main body, or the light-emitting unit is cooperatively operated with the illuminating unit in the lamp main body.

Preferably, in the case that the light-emitting unit is operated independent of the illuminating unit in the lamp main body, a rechargeable battery is provided in the light-emitting unit, and the light-emitting unit is controlled to be operated in at least one of a human body induction control manner, a light sensing control manner or a remote control manner; and in the case that the light-emitting unit is cooperatively operated with the illuminating unit in the lamp main body, the light-emitting unit is electrically connected with the illuminating unit in the lamp main body through a conductor terminal or a wireless charging manner.

By adopting the above schemes, at least one of the above technical schemes used by the disclosure may achieve the following beneficial effects.

Through enabling the trim unit which has a function of adjusting the light emitted by the illuminating unit to be fixed to the lamp main body in the easily removable manner, it may not only have an effect of enhancing appearance beauty of the lamp, but also reduce a requirement for a space height of lamp installation, so that the type and/or the style of the light emitted from the lamp is changed, the achieved lamp is simple in structure, convenient for disassembly and assembly, and remarkable in decorative effect.

BRIEF DESCRIPTION OF THE DRAWINGS

Drawings of the description for constituting a part of the present application are used to provide further understanding of the disclosure, exemplary embodiments of the disclosure and descriptions thereof are used to explain the disclosure, and do not constitute improper limitation to the disclosure. In the drawings.

DETAILED DESCRIPTION OF THE EMBODIMENTS

Figure 1:
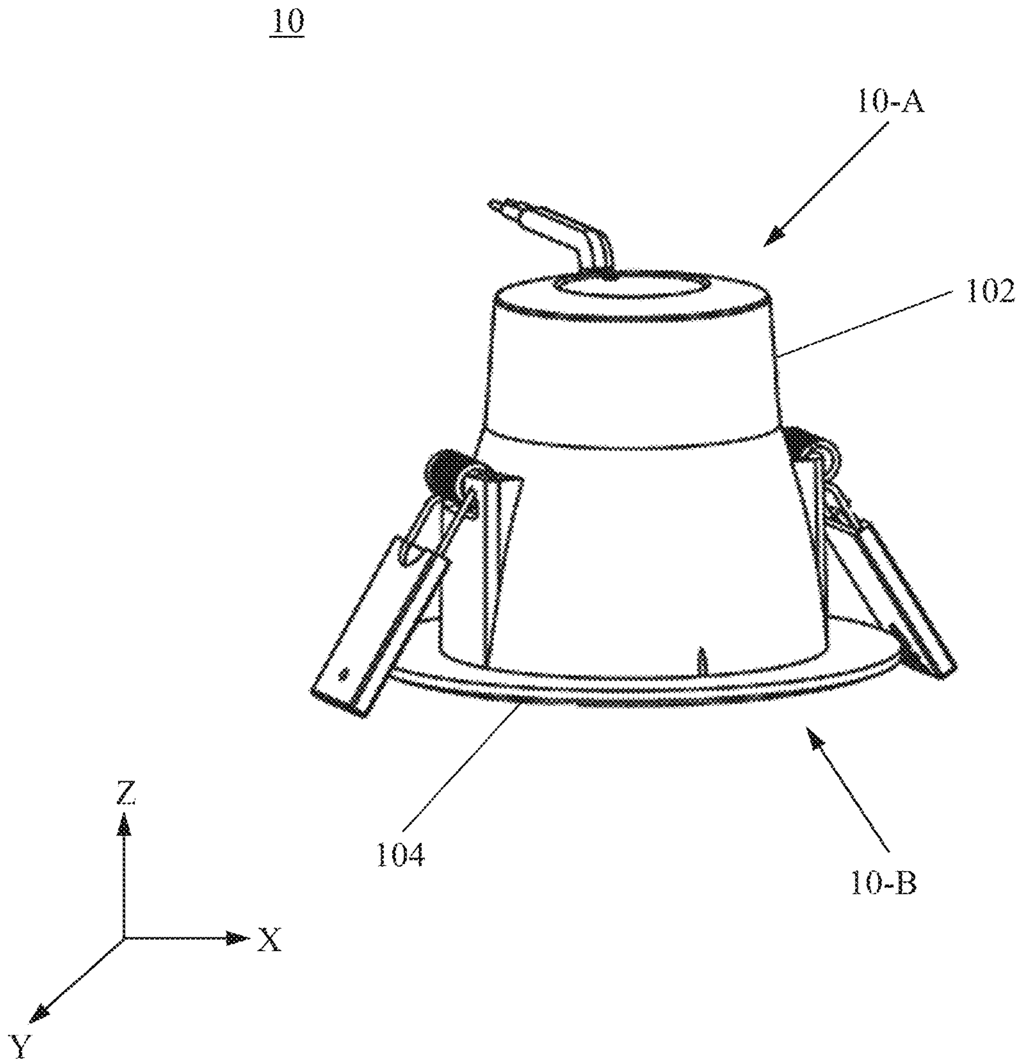
FIG. 1 shows a schematic diagram of an exemplary combined structure of a lamp in accordance with the disclosure.

It is to be noted that embodiments in the present application and features in the embodiments may be combined with each other in the case without conflicting. The disclosure is described in detail below with reference to the drawings in combination with the embodiments.

It should be pointed out that, unless otherwise specified, all technical and scientific terms used in the present application have the same meaning as commonly understood by those of ordinary skill in the art.

In the disclosure, unless otherwise specified, orientation words used such as "up, down, top, and bottom" are usually for directions shown in the drawings, or for a component itself in vertical, perpendicular or gravitational direction; similarly, in order to understand and describe conveniently, "inner and outer" refer to the inner and outer relative to an outline of each component itself, but the above orientation words are not used to limit the disclosure.

Figure 2:
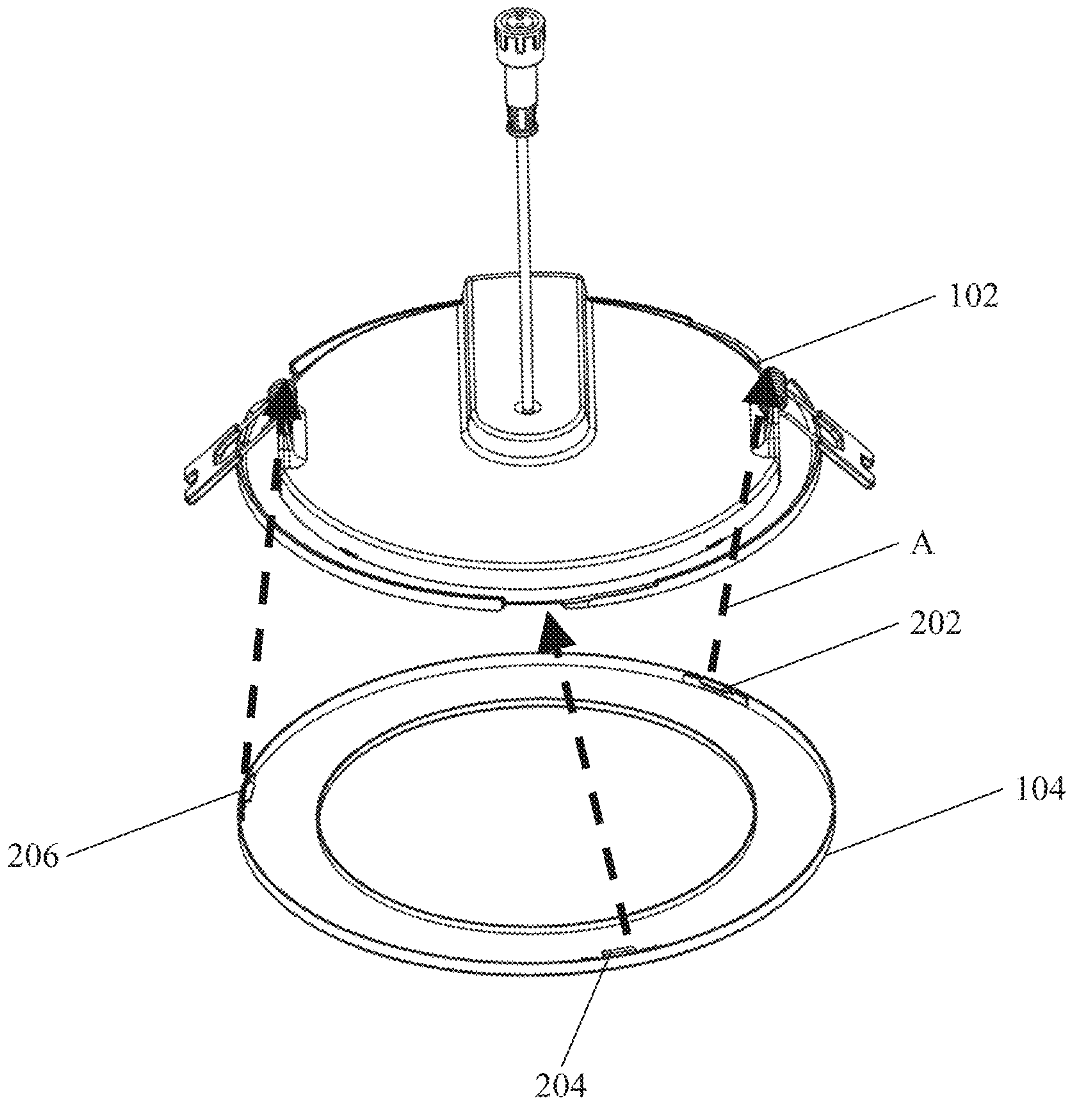
FIG. 2 shows a schematic diagram of an exemplary exploded structure of a lamp in accordance with the disclosure.
Figure 3:
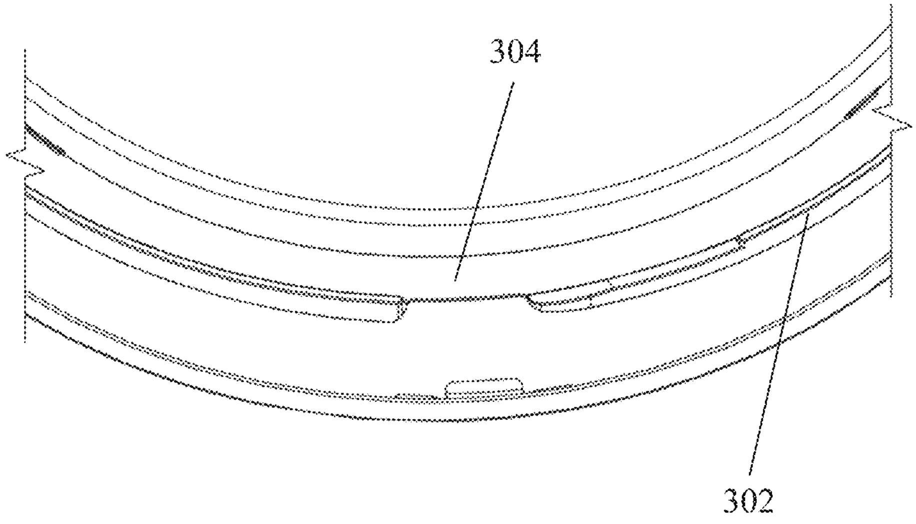
FIG. 3 shows a schematic diagram of an exemplary fixture structure of a lamp main body in accordance with the disclosure.

FIG. 1 shows a schematic diagram of an exemplary combined structure of a lamp in accordance with the disclosure. As shown in FIG. 1, the lamp 10 of the present application includes: a lamp main body 102, and a trim unit 104 which is fixed to the lamp main body 102 in a removable manner. In the lamp main body 102, an illuminating unit (not shown) is installed. According to a direction of light emitted by the illuminating unit, the lamp 10 includes a light-shooting end 10-A and a light-emitting end 10-B along a Z-axis direction. Namely, the light emitted from the illuminating unit is emitted from the light-shooting end 10-A towards the light-emitting end 10-B. A middle portion, positioned on an XY plane, of the trim unit 104 is provided with a light exit port, and the light emitted from the illuminating unit is shot to the light exit port. As shown in FIG. 2, the lamp main body 102 may be embedded in a ceiling, and then, in an installation direction as shown by a direction of arrow in FIG. 2, the light-emitting end of the trim unit 104 is fixed to the lamp main body 102 in the removable manner. The trim unit 104 may be provided with one or more installation parts, for example, the installation parts (such as lug bosses 202, 204 and 206 protruded towards an inner side of the lamp main body 102) may be uniformly interval-installed along a circumferential direction of the trim unit 104. For example, the lug bosses 202, 204 and 206 may be directly locked on the lamp main body, thereby it is achieved that the trim unit 104 is fixed to the lamp main body 102 in a fastener manner. For another example, as shown in FIG. 3, as a part matched with the installation parts of the trim unit 104, the inner side of the lamp main body may be provided with a fixture. In FIG. 3, at the inner side of the lamp main body, the fixture is installed along an inner circumferential surface. In an embodiment as shown in FIG. 3, the inner side of the lamp main body is axially provided with a guide rail 302, and grooves 304 are uniformly interval-installed on the guide rail 302, the lug bosses installed on the trim unit 104 are abutted with the grooves 304 of the lamp main body, and then it is rotated along the guide rail 302, it may be achieved that the trim unit 104 is fixed to the lamp main body 102. Whether a direct locking manner is used or a manner in which the lug bosses are embedded into the lamp main body through the grooves on the lamp main body and then rotated and fixed is used, it may be achieved that the trim unit is rotated around a Z-axis in the XY plane, thereby a purpose of adjusting a fixing position of the trim unit is achieved. In addition, through interval-installing multiple installation parts along the circumferential direction of the trim unit, multiple fixtures are interval-installed along the circumferential direction of the lamp main body, the fixing firmness of the trim unit may be improved.

As above, in the disclosure, through enabling the trim unit which has a function of adjusting the light emitted by the illuminating unit to be fixed to the lamp main body in the easily removable manner, it may not only have an effect of enhancing appearance beauty of the lamp, but also reduce a requirement for a space height of lamp installation and diversify the type and/or the style of the light emitted from the lamp. A specific structure of the trim unit which has the function of adjusting the light emitted by the illuminating unit is described in detail below with reference to the drawings.

Figure 4:
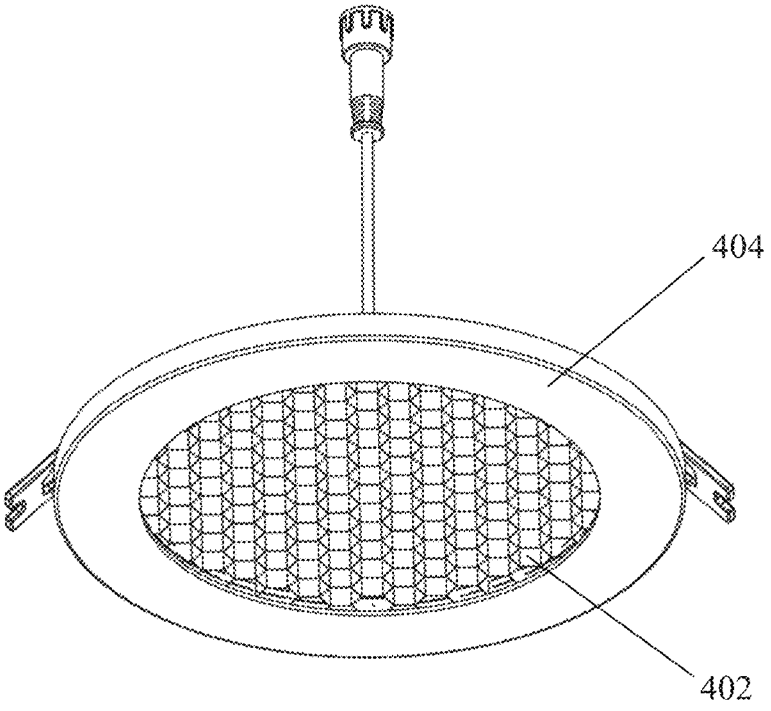
FIG. 4 shows a structure schematic diagram of a lamp in a first embodiment in accordance with the disclosure.

FIG. 4 shows a structure schematic diagram of a lamp in a first embodiment in accordance with the disclosure. In FIG. 4, the trim unit includes an adjusting part 402 positioned at a light exit port and a trim ring 404 used for fixing the adjusting part 402, the adjusting part 402 performs anti-dazzle treatment on the light emitted by the illuminating unit. For example, the adjusting part 402 may be a grid structure, a surface roughening structure, an anti-dazzle film and the like. The adjusting part 402 may be integrally formed with the trim ring 404, or combined with the trim ring 404 as a separate component.

Figure 5:
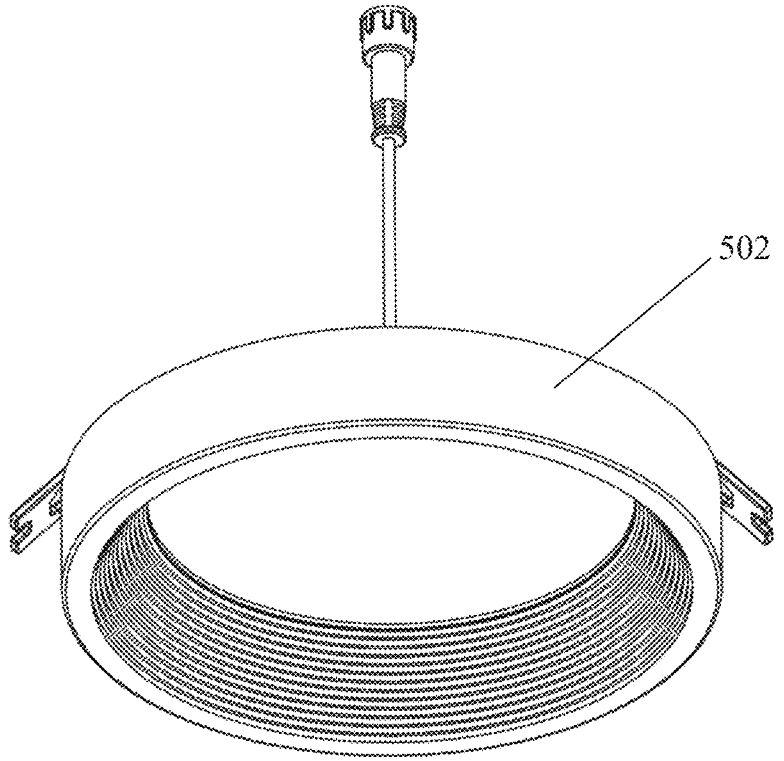
FIG. 5 shows a structure schematic diagram of a lamp in a second embodiment in accordance with the disclosure.

FIG. 5 shows a structure schematic diagram of a lamp in a second embodiment in accordance with the disclosure. In FIG. 5, the trim unit is formed as an extension wall 502 which is longitudinally extended for a circle towards the light-emitting end 10-B (refer to FIG. 1), the extension wall 502 adjusts angle and distribution of the light emitted by the illuminating unit, thereby an anti-dazzle function is achieved. The trim unit is formed as the extension wall 502, the angle and distribution of the light emitted by the illuminating unit may be changed to achieve the anti-dazzle function, and because the installation space height of the lamp is not affected by the extension wall, the structure is very beneficial in a situation where a space installation height is limited.

Figure 6:
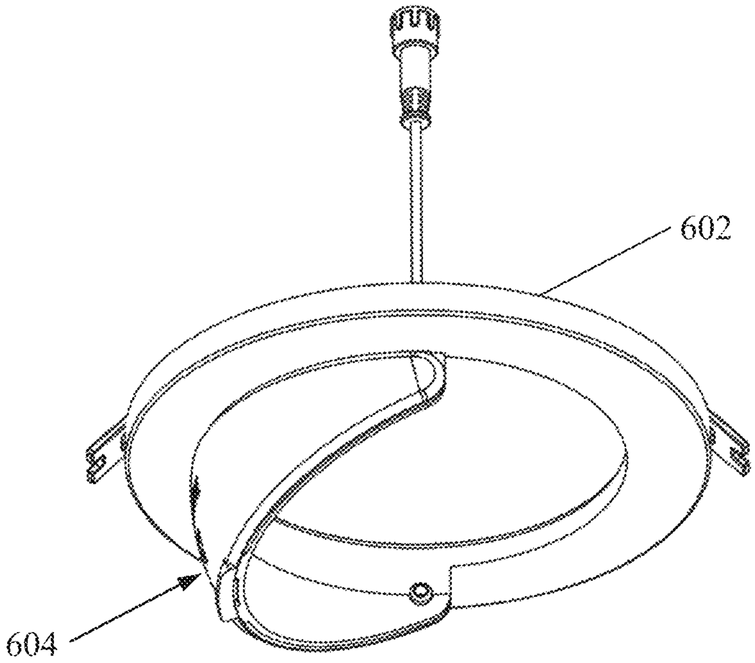
FIG. 6 shows a structure schematic diagram of a lamp in a third embodiment in accordance with the disclosure.
Figure 6:
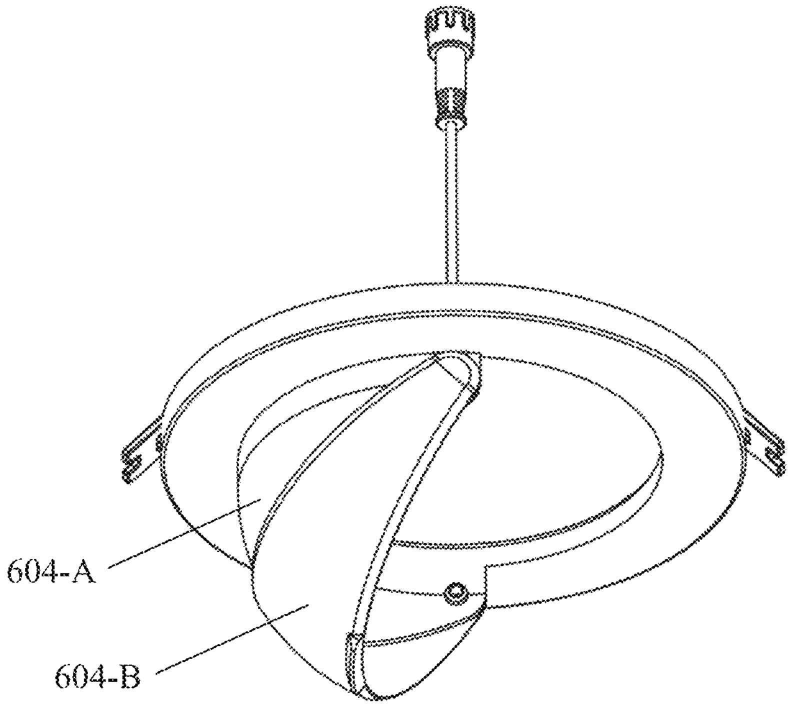

FIG. 6 shows a structure schematic diagram of a lamp in a third embodiment in accordance with the disclosure. As shown in FIG. 6, the trim unit includes a trim ring 602 and a light-shielding plate 604. The trim ring 602 may be provided with one or more installation parts, for example, as described in FIG. 2, the installation parts (such as lug bosses protruded towards an inner side of the lamp main body) may be uniformly interval-installed along a circumferential direction of the trim ring 602, thus the installation parts (for example, the lug bosses) installed on the trim ring 602 are directly locked with the lamp main body, or abutted with the lamp main body through the fixtures (for example, the grooves as shown in FIG. 3) of the lamp main body, thereby the trim ring 602 is fixed to the amp main body. In addition, the light-shielding plate 604 includes an inner light-shielding plate 604-A and an outer light-shielding plate 604-B, the inner light-shielding plate 604-A and the outer light-shielding plate 604-B may be switched between states of being mutually superposed (for example, a completely overlapped state as shown in (A) of FIG. 6) and unfolded (for example, a state in which the inner light-shielding plate 604-A and the outer light-shielding plate 604-B are adjacent to each other but not overlapped as shown in (B) of FIG. 6). For example, the inner light-shielding plate 604-A is integrally formed with the trim ring 602, and the inner light-shielding plate 604-A is provided with a shaft hole, the inner light-shielding plate 604-A and the outer light-shielding plate 604-B are connected in a pivot manner, the outer light-shielding plate 604-B is rotated in the pivot manner; or the trim ring 602 is provided with a shaft hole, the inner light-shielding plate 604-A and the outer light-shielding plate 604-B are connected with the trim ring 602 in the pivot manner, and in the case that the inner light-shielding plate 604-A and the outer light-shielding plate 604-B are switched between the states of being mutually superposed (as shown in (A) of FIG. 6) and unfolded (as shown in (B) of FIG. 6), the inner light-shielding plate 604-A is kept fixed relative to the trim ring 602, and only the outer light-shielding plate 604-B is rotated in the pivot manner. Through the structure as shown in FIG. 6, because it may be rotated along the Z-axis (as shown in FIG. 1) in the XY plane in the case that the trim ring 602 is fixed to the lamp main body, and the inner light-shielding plate 604-A and the outer light-shielding plate 604-B may be switched between the states of being mutually superposed (as shown in (A) of FIG. 6) and unfolded (as shown in (B) of FIG. 6), it may be achieved that a light-shielding angle may be changed within a range, for example, 30 to 60 degrees, relative to the Z-axis (as shown in FIG. 1), and the direction of the light emitted from the illuminating unit is adjusted.

Figure 7:
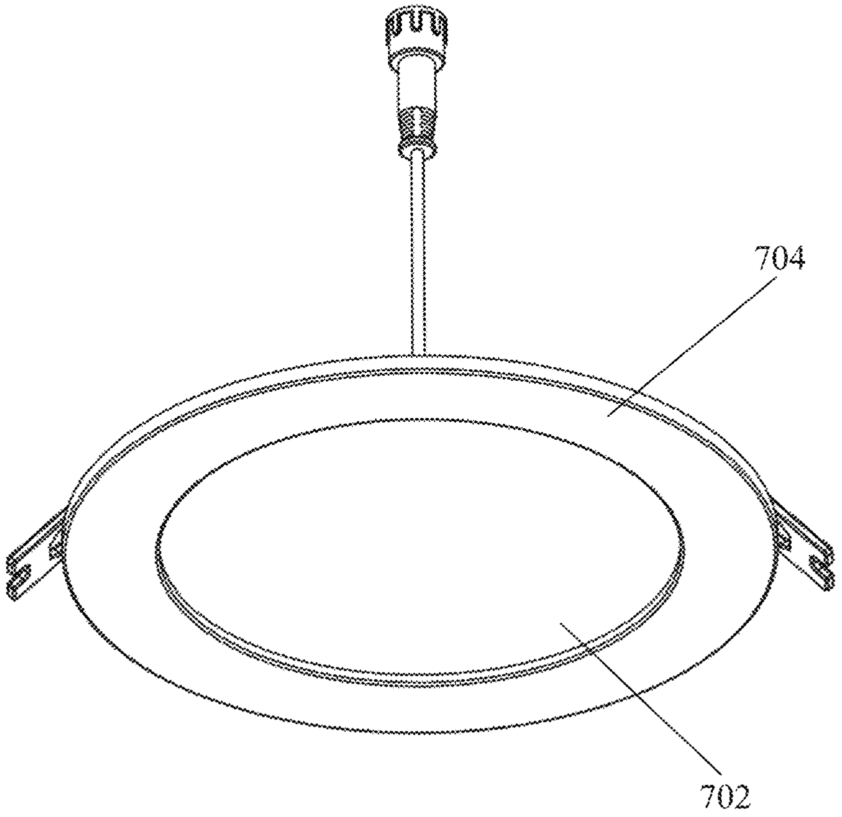
FIG. 7 shows a structure schematic diagram of a lamp in a fourth embodiment in accordance with the disclosure.

FIG. 7 shows a structure schematic diagram of a lamp in a fourth embodiment in accordance with the disclosure. In FIG. 7, the trim unit includes an adjusting part 702 positioned at a light exit port and a trim ring 704 for fixing the adjusting part 702, the adjusting part 702 adjusts a color or a light intensity of the light emitted by the illuminating unit. For example, the adjusting part 702 may be a color filter. The adjusting part 702 may be integrally formed with the trim ring 704, or combined with the trim ring 704 as a separate component.

Figure 8:
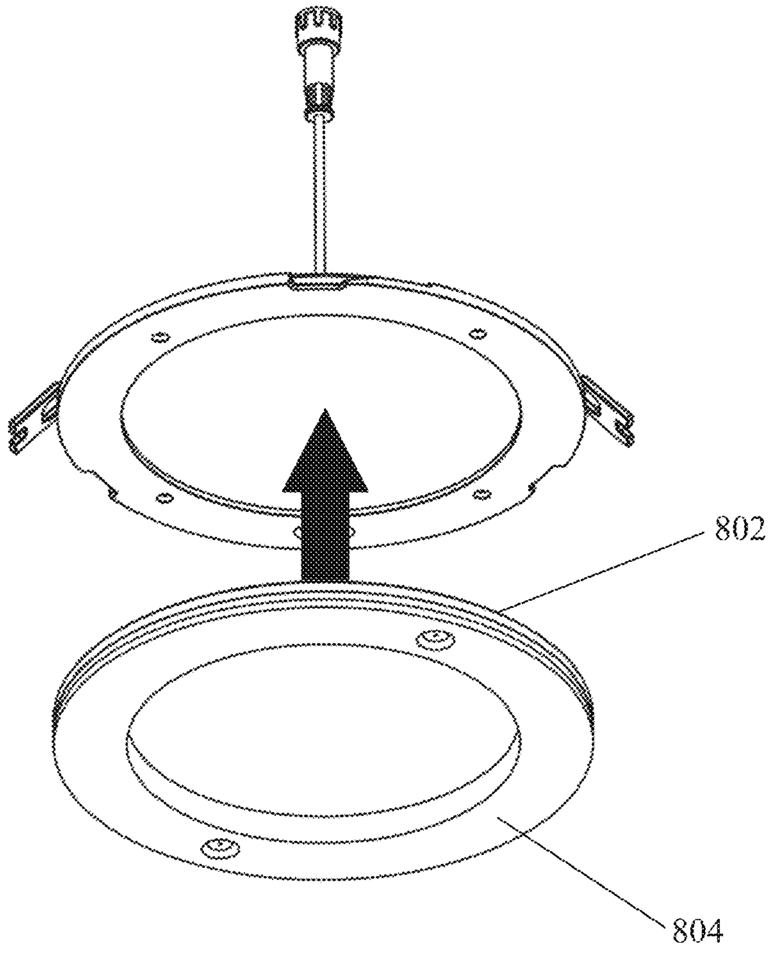
FIG. 8 shows a structure schematic diagram of a lamp in a fifth embodiment in accordance with the disclosure.

FIG. 8 shows a structure schematic diagram of a lamp in a fifth embodiment in accordance with the disclosure. As shown in FIG. 8, the trim unit includes a trim ring 804. At least one light-emitting unit 802 is embedded in the trim ring 804. For example, as shown in FIG. 8, the light-emitting unit 802 is a light-emitting unit installed along a circumferential direction of the trim ring 804. For example, the light-emitting unit 802 is operated independent of the illuminating unit in the lamp main body, or the light-emitting unit 802 is cooperatively operated with the illuminating unit in the lamp main body. In the case that the light-emitting unit 802 is operated independent of the illuminating unit in the lamp main body, a rechargeable battery is provided in the light-emitting unit 802, a control manner of the light-emitting unit 802 is independent of a control manner of the lamp main body, for example, the control manner of the light-emitting unit 802 may be a human body induction control manner, a light sensing control manner or a remote control manner independent of the lamp main body. In the case that the light-emitting unit 802 is cooperatively operated with the illuminating unit in the lamp main body, the light-emitting unit 802 may be electrically connected with the illuminating unit in the lamp main body through a conductor terminal or a wireless charging manner. Through the configuration of at least one light-emitting unit is embedded in the adjusting part, a downlight provided with the trim unit may present various lighting effects.

Here, the disclosure is implemented by a most preferred manner, thereby a problem in the related art that a decoration effect of the downlight is single is solved herein.

It may be seen from the above descriptions that the above embodiments of the disclosure achieve the following technical effects. 1. The number of stock keeping units (SKU) of a lamp production line is reduced as whole. 2. The appearance decoration effect of the lamp is more easily changed. 3. The convenience and diversified selection of lighting adjustment are achieved. 4. Disassembly and assembly work is time-saving and labor-saving.

Apparently, the embodiments described above are only a part of the embodiments of the disclosure, and not all of the embodiments. Based on the embodiments in the disclosure, all other embodiments obtained by those of ordinary skill in the art without creative work shall fall within a scope of protection of the disclosure.

It is to be noted that terms used here are only for describing the specific implementation manners, and are not intended to limit the exemplary implementation manners according to the present application. As used herein, unless otherwise specified in the context, a singular form is also intended to include a plural form. In addition, it should also be understood that while terms "comprising" and/or "including" are used in the description, it indicates that there is a feature, a process, a work, a device, a component and/or combinations thereof.

It is to be noted that terms "first", "second" and the like in the description and claims of the present application and the above drawings are used to distinguish similar objects, and are not necessarily used to describe a specific sequence or precedence order. It should be understood that data used in this way may be interchanged in the suitable case, so that the implementation manners of the present application described here may be implemented in a sequence other than those illustrated or described here.

The above are only the preferred embodiments of the disclosure, and are not used to limit the disclosure, various modifications and changes may be made to the disclosure by those skilled in the art. Any modifications, equivalent replacements, improvements and the like made within spirit and principle of the disclosure shall be included in the scope of protection of the disclosure.

What is claimed is:

1. Apparatus comprising:

a trim ring for a lamp, the trim ring including plural lug bosses arranged along a circumference of the trim ring and configured for attachment to a lamp main body of the lamp at a light-emitting end of the lamp main body in a removable manner, such that the lug bosses are configured to be initially inserted into and brought into contact with a plurality of corresponding surfaces defining grooves uniformly arranged and leading into an adjacent portion of a guide rail arranged circumferentially along a side of the lamp main body and later rotated and moved onto the adjacent portion of the guide rail, thereby fixing the trim ring to the lamp main body, wherein the adjacent portion of the guide rail has a graduated thickness; and an adjusting part configured for adjusting light emitted by an illuminating unit installed in the lamp main body.

2. The apparatus according to claim 1, wherein the adjusting part comprises at least one of the following: a grid structure, a surface roughening structure, and an anti-dazzle film, and the adjusting part is configured to perform an anti-dazzle treatment on the light emitted by the illuminating unit.

3. The apparatus according to claim 2, wherein the adjusting part is integrally formed with the trim ring, or the adjusting part as a separate component is combined with the trim ring.

4. The apparatus according to claim 1, wherein the adjusting part comprises an extension wall longitudinally extended at an outer edge of the trim ring, and the extension wall is configured to perform the anti-dazzle treatment on the light emitted by the illuminating unit.

5. The apparatus according to claim 1, wherein the adjusting part is a color filter, and the color filter is configured to adjust a color and/or a light intensity of the light emitted by the illuminating unit.

6. The apparatus according to claim 1, wherein the adjusting part comprises the trim ring and a light-shielding plate, and the light-shielding plate comprises an inner light-shielding plate and an outer light-shielding plate, the inner light-shielding plate and the outer light-shielding plate being configured to be switched between states of being mutually superposed and unfolded.

7. The apparatus according to claim 6, wherein the inner light-shielding plate is integrally formed with the trim ring, the inner light-shielding plate is provided with a shaft hole, the inner light-shielding plate and the outer light-shielding plate are connected in a pivot manner, and the outer light-shielding plate is configured to be rotated in the pivot manner; or the trim ring is provided with a shaft hole, the inner light-shielding plate and the outer light-shielding plate are connected with the trim ring in the pivot manner, and in the case that the inner light-shielding plate and the outer light-shielding plate are switched between the states of being mutually superposed and unfolded, the inner light-shielding plate is kept fixed with respect to the trim ring, and the outer light-shielding plate is configured to be rotated in the pivot manner.

8. The apparatus according to claim 1, wherein the adjusting part comprises a light-emitting unit, the light-emitting unit is configured to be operated independent of the illuminating unit in the lamp main body, or the light-emitting unit is configured to be cooperatively operated with the illuminating unit in the lamp main body.

9. The apparatus according to claim 8, wherein in the case that the light-emitting unit is configured to be operated independent of the illuminating unit in the lamp main body, a rechargeable battery is provided in the light-emitting unit, and the light-emitting unit is configured to be controlled to be operated in at least one of a human body induction control manner, a light sensing control manner or a remote control manner; and in the case that the light-emitting unit is cooperatively operated with the illuminating unit in the lamp main body, the light-emitting unit is electrically connected with the illuminating unit in the lamp main body through a conductor terminal or a wireless charging manner.

10. A lamp, comprising:

a lamp main body having an illuminating unit installed in the lamp main body, and comprising one or more fixtures; and a trim unit comprising:

a trim ring for a lamp, the trim ring including plural lug bosses arranged along a circumference of the trim ring and configured for attachment to the lamp main body at a light-emitting end of the lamp main body in a removable manner, such that the plural lug bosses are configured to be initially inserted into and brought into contact with a plurality of corresponding surfaces defining grooves uniformly arranged and leading into an adjacent portion of a guide rail arranged circumferentially along a side of the lamp main body and later rotated and moved onto the adjacent portion of the guide rail, thereby fixing the trim ring to the lamp main body, wherein the adjacent portion of the guide rail has a graduated thickness, and an adjusting part, configured for adjusting light emitted by the illuminating unit.

11. The lamp as claimed in claim 10, wherein the adjusting part is at least one of the following: a grid structure, a surface roughening structure, and an anti-dazzle film, and wherein the adjusting part is configured to perform anti-dazzle treatment on the light emitted by the illuminating unit.

12. The lamp as claimed in claim 11, wherein the adjusting part is integrally formed with the trim ring, or the adjusting part is combined with the trim ring as a separate component.

13. The lamp as claimed in claim 10, wherein the adjusting part comprises an extension wall longitudinally extended at an outer edge of the trim unit, and the extension wall is configured to perform the anti-dazzle treatment on the light emitted by the illuminating unit.

14. The lamp as claimed in claim 10, wherein the adjusting part is a color filter, and the color filter adjusts a color and/or a light intensity of the light emitted by the illuminating unit.

15. The lamp as claimed in claim 10, wherein the adjusting part comprises the trim ring and a light-shielding plate the light-shielding plate comprises an inner light-shielding plate and an outer light-shielding plate, the inner light-shielding plate and the outer light-shielding plate being configured to be switched between states of being mutually superposed and unfolded.

16. The lamp as claimed in claim 15, wherein the inner light-shielding plate is integrally formed with the trim ring, and the inner light-shielding plate is provided with a shaft hole, the inner light-shielding plate and the outer light-shielding plate are connected in a pivot manner, and the outer light-shielding plate is configured to be rotated in the pivot manner; or the trim ring is provided with a shaft hole, the inner light-shielding plate and the outer light-shielding plate are connected with the trim ring in the pivot manner, and in the case that the inner light-shielding plate and the outer light-shielding plate are switched between the states of being mutually superposed and unfolded, the inner light-shielding plate is kept fixed relative to the trim ring, and the outer light-shielding plate is configured to be rotated in the pivot manner.

17. The lamp as claimed in claim 10, wherein the adjusting part comprises a light-emitting unit, and the light-emitting unit is configured to be operated independent of the illuminating unit in the lamp main body, or the light-emitting unit is configured to be cooperatively operated with the illuminating unit in the lamp main body.

18. The lamp as claimed in claim 17, wherein in the case that the light-emitting unit is configured to be operated independent of the illuminating unit in the lamp main body, a rechargeable battery is provided in the light-emitting unit, and the light-emitting unit is configured to be operated in at least one of a human body induction control manner, a light sensing control manner or a remote control manner; and in the case that the light-emitting unit is configured to be cooperatively operated with the illuminating unit in the lamp main body, the light-emitting unit is electrically connected with the illuminating unit in the lamp main body through a conductor terminal or a wireless charging manner.

19. A method for installing a trim ring of a lamp, the method comprising:

inserting plural lug bosses of the trim ring into a plurality of corresponding surfaces defining grooves uniformly arranged and leading into an adjacent portion of a guide rail arranged circumferentially along an inner side of a lamp main body of the lamp at a light-emitting end of the lamp;

after the inserting of the lug bosses, later rotating and moving the lug bosses onto the adjacent portion of the guide rail, thereby fixing the trim ring to the lamp main body, wherein the adjacent portion of the guide rail has a graduated thickness; and adjusting light emitted by an illuminating unit installed in the lamp main body via an adjusting part of the trim ring.

20. The method of claim 19, wherein when the lug bosses are inserted into the surfaces defining the grooves, the trim ring of the adjusting part is fixed to the lamp main body at a light-emitting side of the lamp main body in a removable manner, the method further comprising providing a light-shielding plate including an inner light-shielding plate and an outer light-shielding plate, and switching the inner light-shielding plate and the outer light-shielding plate can be switched between states of being mutually superposed and unfolded.

* * * * *